Feb. 27, 1962  Z. TAKATS ETAL  3,022,715
CAMERA SHUTTER MECHANISM
Filed Aug. 5, 1958  4 Sheets-Sheet 1

INVENTORS
ZOLTAN TAKATS
STEVEN ONDRUSEK
BY
ATTORNEYS

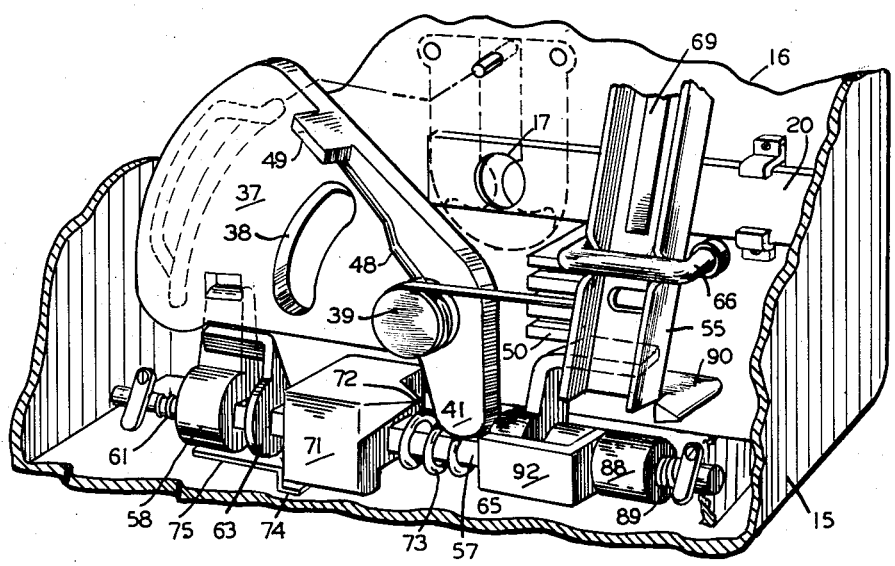
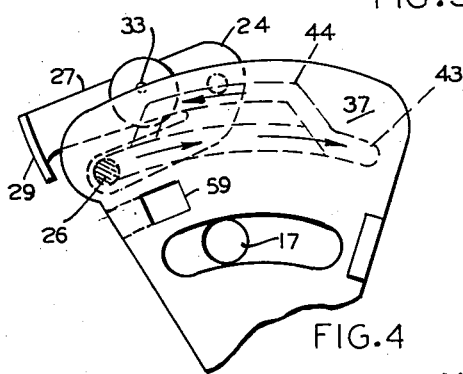
FIG.3
FIG.4
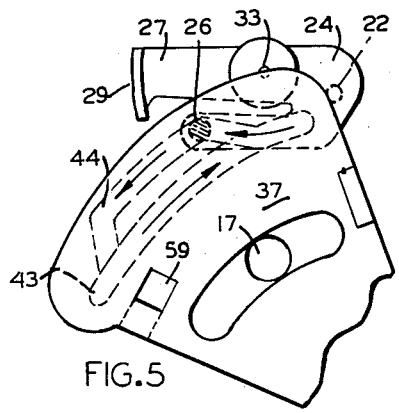
FIG.5
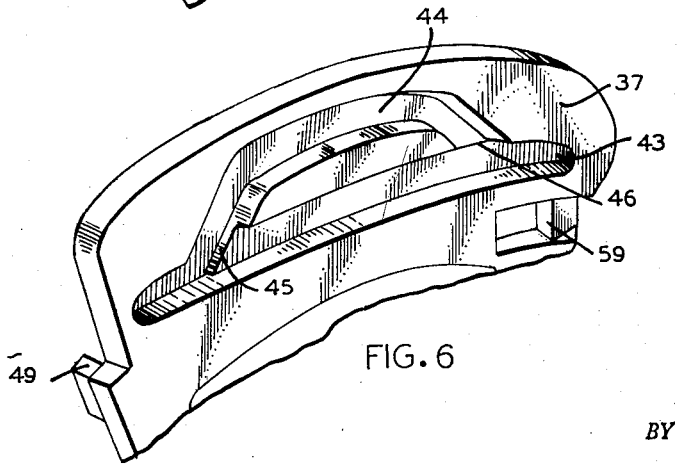
FIG.6
INVENTORS
ZOLTAN TAKATS
STEVEN ONDRUSEK
BY
ATTORNEYS Feb. 27, 1962  Z. TAKATS ETAL  3,022,715
CAMERA SHUTTER MECHANISM
Filed Aug. 5, 1958  4 Sheets-Sheet 4

INVENTORS
ZOLTAN TAKATS
STEVEN ONDRUSEK
BY
ATTORNEYS 3,022,715
CAMERA SHUTTER MECHANISM
Zoltan Takats, Vestal, and Steven Ondrusek, Binghamton, N.Y., assignors to General Aniline & Film Corporation, New York, N.Y., a corporation of Delaware
Filed Aug. 5, 1958, Ser. No. 753,299
6 Claims. (Cl. 95—62)

This invention relates to photographic cameras and, more particularly, to a simple shutter mechanism for cameras of the fixed-focus type.

It is a primary object of the invention to devise a shutter mechanism in simple form which provides such functional features as are found only in complex assemblies.

It is another object of the invention to provide a shutter mechanism for simple cameras having dual-leaf shutter blades actuated by a pretensioned master member.

It is a feature of the invention that the shutter mechanism in accordance therewith is pretensioned by the film winding mechanism and the release lever is automatically locked after exposure.

Another feature of the invention is that the shutter blade actuation control lever simultaneously effects closure of a flash synchronization switch.

Other objects and features will be apparent from the following description of the invention, pointed out in particularity in the appended claims and taken in connection with the accompanying drawings, in which:

FIG. 3 is a perspective view of the shutter mechanism with the camera casing cut away for the sake of illustration;

FIG. 4 is an enlarged, partial view of the master member and the actuator arm in released position;

FIG. 5 is a similar view with the shutter in cocked position;

FIG. 6 is a partial, enlarged, perspective view of the master member;

Figure 1:
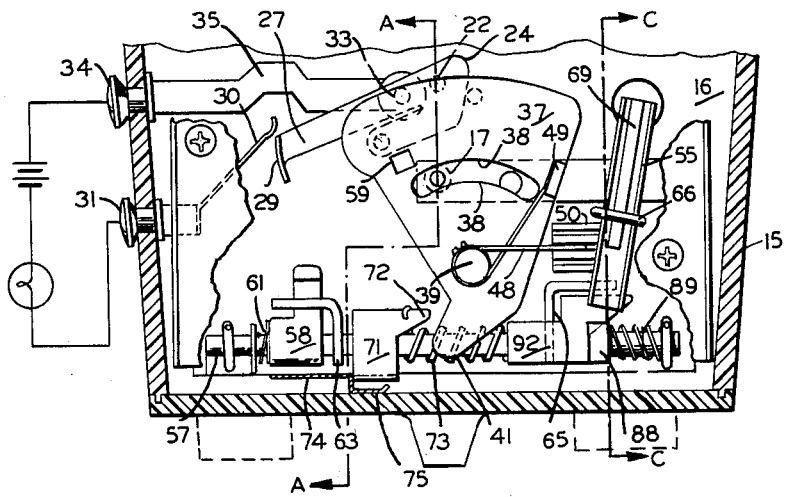
FIG. 1 is a back view of the shutter within the camera casing with the master member in released position.

Referring to the drawings, the shutter mechanism is so constructed that it can easily be built into a molded plastic casing 15 of a box-type or similar camera. For this reason, the component parts of the shutter are laid out to take up the minimum amount of space in the width of the camera between the lens and the film exposure area. In this manner, it is feasible to construct a box camera of narrow design.

The shutter components are attached to the inner face of the front wall of the camera casing 15 which is preferably molded and holds the various inserts to which the parts are secured. In fact, the inner face thus becomes the "base plate" of the shutter and, for the sake of simplicity, will be referred to in the specification and claims as the base plate and identified by reference character 16.

Figures 12, 13:
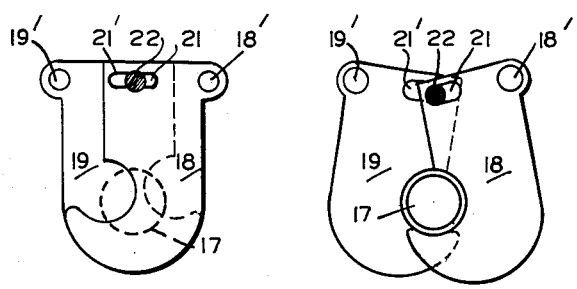
FIG. 12 is a front view of the shutter leaves in closed position.
FIG. 13 is a similar view of the shutter leaves in open position.

The base plate 16 has an aperture opening 17 in front of which, and covering it, are the shutter leaves 18 and 19. A diaphragm plate 20 is slidably supported on the base plate 16 to be actuated from the front of the camera (not shown) to change the diameter of the aperture 17. As seen in FIGS. 12 and 13, the shutter leaves are of the pendulous type, each being supported over a pivot 18' and 19', respectively, and each having a slot 21 and 21', respectively, the two of which overlap and accommodate the actuator pin 22. By virtue of the pendulous suspension and lever arm ratio, a small movement of the pin 22 in the downward direction suffices to constrain the shutter blades 18 and 19 to separate and thereby uncover the aperture 17 in the base plate 16.

Figure 2:
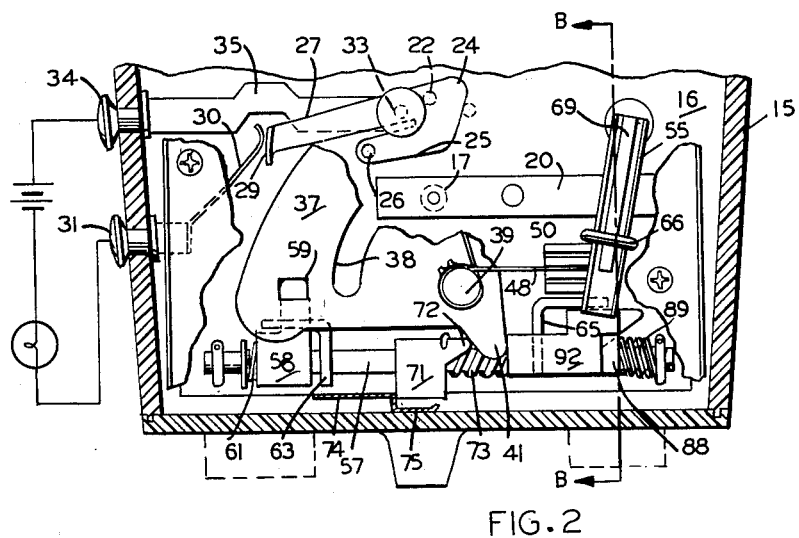
FIG. 2 is a similar view with the master member in tensioned position.

The pin 22 is affixed to a lever arm 24 of special configuration having a bent-back portion 25 carrying a pin 26 at the end thereof and a laterally extending leg 27 having a flared-up end 29 which cooperates with an electrical contactor 30 attached to contact pin 31 extending from the camera casing 15. The arm 24 is pivoted over a stud 33 attached to the base plate 16. Electrical conductivity to the other contact pin 34 in the casing 15 of the camera is provided by the bus 35. In FIGS. 1 and 2, a schematic circuit of the flash lamp is shown connected between pins 31 and 34.

The reciprocating movement of the lever arm 24 which, as mentioned before, actuates the shutter leaves 18 and 19 by virtue of the pin 22 attached to it, is effected by the master member 37. The latter has a sector-shaped body and is swingably supported over a stud 39 affixed to the base plate 16, and is powered by a spring 48 wound around it. One end of the spring 48 engages a lug 49 extending from the body of the master member 37, while the other end engages one of a plurality of recesses cut into a block 50 which is a molded part of the base plate 16. In this manner, the tension of the spring 48 may be adjusted. A suitable elongated opening 38 in the master member 37 clears the aperture 17 so that the light rays will not be obstructed by the master member. A toe portion 41 of the master member 37 extends downwardly for engagement with tensioning and release lever locking means.

The construction of the master member is better seen in FIGS. 4, 5 and 6. A pair of radial cam grooves 43 and 44 are cut in the body portion to accommodate the pin 26 of the lever arm 24. The lower groove 43 is of such length that, in either position of the master member 37, the cam follower pin 26 rests in the groove at the start and at the terminal point, respectively. The second groove 44 has a greater radius but a shorter length and forms an inverted U-shape, each leg of which communicates with the groove 43. Moreover, the groove 44 has a somewhat greater depth at the start so that, as seen in FIG. 6, a ledge 45 is formed at the junction point of the two grooves, the purpose of which is to divert the cam follower pin 26 into the upper groove for shutter actuation—but it tapers toward the end where it re-enters the groove 43 to form a ledge 46 preventing the pin 26 from entering it upon tensioning of the master member 37.

The various functions of the shutter mechanism, such as the cocking of the master member 37, the release thereof, and the locking of the release lever 55 are effected by the control bar 57. The latter is disposed in parallel relationship to the base plate 16 near the bottom of the camera and supports various functional elements of the shutter, some of which are slidably arranged thereon and also follow the rotational movement thereof. Where such composite movement is desired, the bar 57 is of rectangular cross-section, otherwise it is of cylindrical shape.

The first functional element supported on one end of the bar 57 so as to freely rotate thereon is the latch 58. It engages the cutout 59 on the master member 37 when the latter is in tensioned position as shown in FIGS. 2 or 3. The lever 24 is omitted from the perspective view (FIG. 3) for the sake of clarity. The spring 61 coiled over the bar 57 urges the latch 58 to engage the master member 37. In order to release the latch 58 by movement of the release lever 55, there is provided a finger 63 which is forced to rotate with the rotation of the bar 57 and a trip finger 65 similarly mounted on the bar 57 which engages the underside of the release lever 55. The latter is in the form of a channel-bar fulcrumed over a strap 66 fastened to the plate 16. One end of the lever 55 abuts against the release button 67 which extends from the camera housing 15. A spring 69 on the inner face of the lever 55 assures contact with the release button 67.

Figure 7:
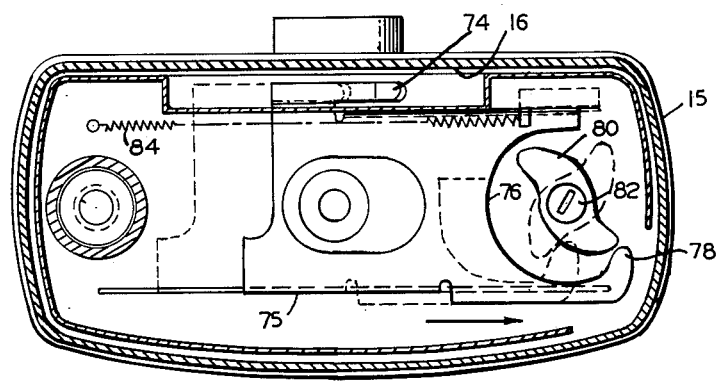
FIG. 7 is a cutaway view of the camera showing the intercoupling between the shutter tensioning mechanism and the film transport.

Next to the finger 63 and slidable over the bar 57 is the block 71 which has a protruding tip 72 adapted to engage the toe portion 41 of the master member 37. A spring 73 coiled over the bar 57 urges the block 71 out of engagement with the toe portion 41. The sliding movement of the block 71 toward the toe 41 in order to tension the master member 37 is effected by the ledge 74 of plate 75. As seen in FIG. 7, the plate 75 is slidably supported in the base of the camera and is provided with a cutout 76 terminating in a cam follower 78. The cutout 76 accommodates the cam 80 which is affixed to the spindle 82 which engages the film spool (not shown here). A spring 84 urges the plate 75 to return to its rest position, shown in dotted line, whenever the cam 80 is out of engagement with the cam follower 78. As seen in FIGS. 1, 2 and 3, the ledge 74 abuts against the block 71.

Figure 9:
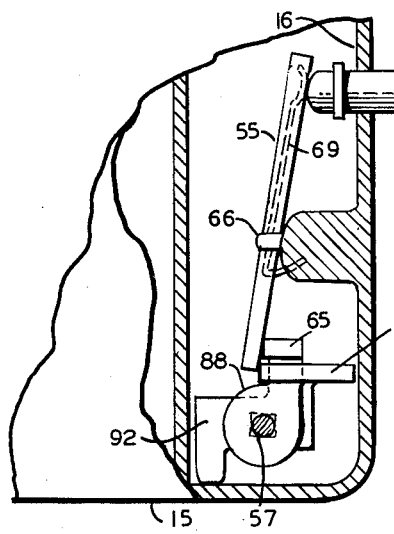
FIG. 9 is a partial, sectional view showing the release lever in stopped position, taken along lines C—C of FIG. 1.
Figure 10:
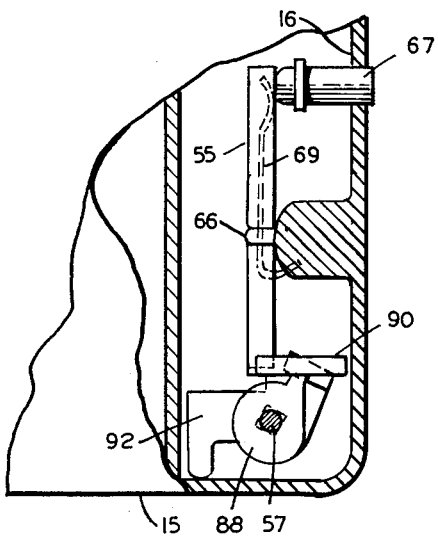
FIG. 10 is a similar view, taken along lines B—B of FIG. 2.
Figure 11:
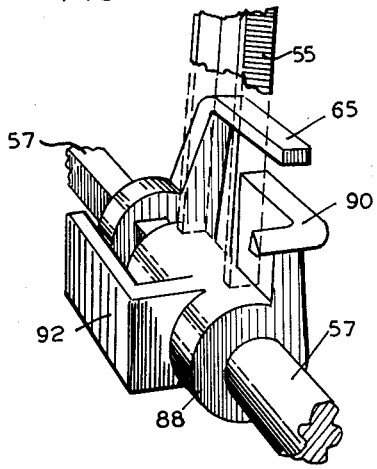
FIG. 11 is an enlarged, perspective view of the release lever stop mechanism.

Following the description of the shutter elements mounted on the bar 57, an automatic locking mechanism for the release lever 55 comprises a sleeve 88 which is freely slidable on the round part of bar 57 and is biased by a spring 89 in a direction toward the toe portion 41 of the master member 37. An illustration of the function of this is seen in FIGS. 9 and 10, and the enlarged view thereof in FIG. 11 shows that the sleeve 88 has a vertically-extending arm 90 which may slide behind the release lever 55, preventing its operation until disengaged therefrom. A laterally-extending member 92 of the sleeve 88 is adapted to engage the toe portion of the master member 37 so that, upon tensioning movement thereof, the sleeve 88 is constrained to slide in the direction to move the arm 90 free from engagement with the release lever 55. In FIG. 9, it is seen that the sleeve 88 is in such position that the arm 90 is behind the release lever 55 whereas in FIG. 10, the sleeve 88 is so positioned as to permit the release lever 55 to be depressed for triggering the shutter mechanism.

Figure 8:
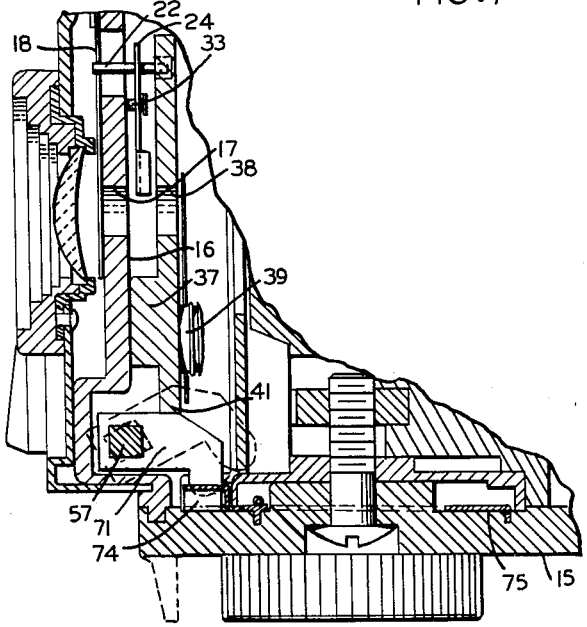
FIG. 8 is a partial view of the camera in cross-section, taken along lines A—A of FIG. 1, indicating the relationship of the master member and associated mechanism.

Referring to the operation of the shutter, let us assume that it is in a released position as shown in FIG. 1. In order to tension the shutter, the film winding knob 83 (FIG. 8) is rotated in a counterclockwise direction whereby the cam 80 engages the cam follower 76, as seen in dotted lines in FIG. 7, and moves the plate 75 to the position shown in full lines. The ledge 74 of the plate 75 causes the block 71 to move in the direction against the toe portion 41 of the master member 37 and displace this around the pivot 39 until the latch 58 engages the cutout 59 in the master member 37. The spring 48 is thus tensioned, powering the master member 37 for shutter actuation when the latch 58 is disengaged. Although several revolutions of the spindle 82 may be necessary to transport the film in the camera from one frame to the next, usually indicated by a number visible to the user of the camera, once the master member 37 is tensioned, repeated actions of the cam 80 will have no disturbing effect. The plate 75 may slide back and forth several times while the film is wound. However, to assure that shutter operation will not be hindered, irrespective of the position in which the cam 80 may be left, the block 71 is lifted, upon rotation of the control bar 57, to clear the ledge 74. This is seen in FIG. 8, the dotted lines indicating the position of the block 71 when the bar 57 is rotated. The block 71 is thus free to slide into rest position under the action of the spring 73 so as not to impede the shutter actuation movement of the master member 37.

Swinging of the master member into cocked position causes the toe portion 41 thereof to engage the member 92 of the sleeve 88 and thereby slide the sleeve 88 in the direction to tension the spring 89 and move the arm 90 out of engagement with the underside of the release lever 55.

It is to be noted that during cocking movement of the master member 37 there is no rotational movement of the arm 24. The cam follower pin 26 of the arm 24 will slide in the groove 43 and will not follow the groove 44 until it reaches the extreme position so as to abut against the ledge 45.

The shutter is now tensioned and ready for operation. When the release button 67 is depressed, the release lever 55 will actuate the trip finger 65 causing the bar 57 to in a clockwise direction. This, in turn, moves the finger 63 which abuts against the latch 58 and disengages the latter from the cutout 59 of the master member 37. At this instant, the master member 37 is free to swing under the power of the spring 48 and in this movement the cam follower pin 26, guided by the ledge 45, follows the path of the groove 44 resulting in rotational movement of the lever 24 so that the pin 22 is moved downwardly. The shutter leaves 18 and 19 are thus opened and remain in open position while the cam follower pin 26 rides in the concentric portion of the groove 44. As soon as the pin 26 follows the radial path of the groove 44 which connects with the groove 43, the arm 24 is returned to its original rest position, closing the shutter leaves 18 and 19. During this rapid reciprocating movement, the speed of which depends upon the tension of the spring 48, the laterally-extending leg 27 of the lever arm 24 also closes the flash ignition circuit, the flared up end 29 engaging the contact 30.

The return movement of the master member 37 disengages the toe 41 from member 92 so that the sleeve 88, powered by the spring 89, may slide back and the arm 90, placed behind the release lever 55, prevent operation of the latter until the film winding knob 83 is turned and the shutter cocked for ensuing operation.

We claim:

1. In a photographic camera having a film winding spindle, a shutter comprising a base plate having an aperture opening, a pair of overlapping, pendulous shutter leaves covering said opening, an actuator arm rotatable over a pivot attached to said plate, said arm having a pin extending into slots in said leaves whereby reciprocating movement of said arm causes separation and closure of said leaves to effect a photographic exposure, means for effecting said reciprocating movement including spring-biased master member swingable over a stud in said plate and tension mechanism therefor, said master member having a toe portion and cam grooves cut in the body thereof, said grooves accommodating a cam follower pin attached to said arm, a control bar rotatably supported in the direction parallel to said plate, master member tensioning means slidable upon said bar for engaging said toe portion and means actuated upon rotation of said spindle for engaging said tensioning means, and latch means secured to said bar and engaging a cutout in said master member for holding said member in tensioned position, a manually operable shutter release lever adapted to rotate said bar for disengaging said latch means whereby the constraining action of the cam grooves of the master member on said cam follower pin effects reciprocating movement of said arm to open and close said shutter leaves, and stop means slidable on said bar preventing operation of said lever after release of said master member.

2. In a photographic camera having a film winding spindle, a shutter comprising a base plate having an aperture opening, a pair of overlapping, pendulous shutter leaves covering said opening, an actuator arm rotatable over a pivot attached to said plate, said arm having a pin extending into slots in said leaves whereby reciprocating movement of said arm causes separation and closure of said leaves to effect a photographic exposure, means for effecting said reciprocating movement including a spring-biased master member swingable over a stud in said plate and tension mechanism therefor, said master member having a toe portion and cam grooves cut in the body thereof, said grooves accommodating a cam follower pin attached to said arm, a control bar rotatably supported in the direction parallel to said plate, master member tensioning means slidable upon said bar for engaging said toe portion and means actuated upon rotation of said spindle for engaging said tensioning means and latch means secured to said bar and engaging a cutout in said master member for holding said member in tensioned position, a manually operable shutter release lever fulcrumed on said plate having at one end a button extending from the camera and the other end engaging a trip finger affixed to said bar for disengaging said latch means whereby the constraining action of the cam grooves of the master member on said cam follower pin effects reciprocating movement of said arm to open and close said shutter leaves, and stop means slidable on said bar preventing operation of said lever after release of said master member.

3. A photographic camera in accordance with claim 2 wherein the cam grooves cut into the body of the master member consists of a first radial groove of such length that in each position of the master member said cam follower pin rests at the start and terminal points of the grooves, respectively, a second radial groove of shorter length than said first groove extending radially therefrom and having an inverted U-shape, both legs of which communicate with said first groove, a portion of said first groove at the junction point of one of said legs being deeper, forming a wall whereby said follower pin is constrained in the direction of cocking movement of said master member to follow said first groove and in the direction of release movement of said master member to follow said second groove.

4. In a photographic camera having a film winding spindle, a shutter comprising a base plate having an aperture opening, a pair of overlapping, pendulous shutter leaves covering said opening, an actuator arm rotatable over a pivot attached to said plate, said arm having a pin extending into slots in said leaves whereby reciprocating movement of said arm causes separation and closure of said leaves to effect a photographic exposure, means for effecting said reciprocating movement including a spring-biased master member swingable over a stud in said plate and tension mechanism therefor, said master member having a toe portion and cam grooves cut in the body thereof, said grooves accommodating a cam follower pin attached to said arm, a control bar rotatably supported in the direction parallel to said plate, master member tensioning means comprising a block slidable upon said bar, said block having a tip for engaging said toe portion and a downwardly-extending leg, and means actuated upon rotation of said spindle for engaging said block, a coil spring over said bar urging said block toward said last mentioned means, and latch means secured to said bar and engaging a cutout in said master member for holding said member in tensioned position, a manually operable shutter release lever fulcrumed on said plate having at one end a button extending from the camera and the other end engaging a trip finger affixed to said bar for disengaging said latch means whereby the constraining action of the cam grooves of the master member on said cam follower pin effects reciprocating movement of said arm to open and close said shutter leaves, and stop means slidable on said bar preventing operation of said lever after release of said master member.

5. In a photographic camera having a film winding spindle, a shutter comprising a base plate having an aperture opening, a pair of overlapping, pendulous shutter leaves covering said opening, an actuator arm rotatable over a pivot attached to said plate, said arm having a pin extending into slots in said leaves whereby reciprocating movement of said arm causes separation and closure of said leaves to effect a photographic exposure, means for effecting said reciprocating movement including a spring-biased master member swingable over a stud in said plate and tension mechanism therefor, said master member having a toe portion and cam grooves cut in the body thereof, said grooves accommodating a cam follower pin attached to said arm, a control bar rotatably supported in the direction parallel to said plate, master member tensioning means comprising a block slidable upon said bar, said block having a tip for engaging said toe portion and a downwardly-extending leg and means actuated upon rotation of said spindle comprising a plate slidably supported in the base of said camera and having a cutout terminating in a cam follower at one end and a downwardly-extending ledge on the other end, a cam member attached to said spindle rotatable in said cutout engaging said cam follower upon rotation causing sliding movement of said plate, whereby said ledge engages said leg of said block, and spring means for returning said plate into rest position when said cam follower is free from said cam member, a coil spring over said bar urging said block toward said last mentioned means, and latch means secured to said bar and engaging a cutout in said master member for holding said member in tensioned position, a manually operable shutter release lever fulcrumed on said plate having at one end a button extending from the camera and the other end engaging a trip finger affixed to said bar for disengaging said latch means whereby the constraining action of the grooves of the master member on said cam follower pin effects reciprocating movement of said arm to open and close said shutter leaves, and stop means slidable on said bar preventing operation of said lever after release of said master member.

6. A photographic camera in accordance with claim 5 wherein said stop means preventing operation of said release lever comprises a sleeve slidable over said bar, having a vertically extending arm adapted to engage said release lever against pivotal movement and a horizontally extending member adapted to engage the toe portion of the master member whereby, upon cocked position of said master member, said sleeve is positioned on said bar in the direction to allow said arm to slide out of engagement from said release lever.

References Cited in the file of this patent
UNITED STATES PATENTS

| 639,993 | Juruick | Dec. 26, 1899 |
| 2,105,475 | Draeger | Jan. 18, 1938 |
| 2,187,953 | Schmidt | Jan. 23, 1940 |
| 2,214,754 | Strassenburg | Sept. 17, 1940 |
| 2,390,216 | Guedon | Dec. 4, 1945 |
| 2,525,549 | Hodges | Oct. 10, 1950 |
| 2,629,302 | Mihalyi | Feb. 24, 1953 |
| 2,782,698 | Hill | Feb. 26, 1957 |
| 2,859,674 | Rentscher | Nov. 11, 1958 |
| 2,887,027 | Rentscher | May 19, 1959 |